United States Patent [19]

Kissler

[11] 3,965,528

[45] June 29, 1976

[54] UNIVERSAL ELBOW ACTION LEVER HANDLE

[75] Inventor: Gerald Kissler, Woodcliff Lake, N.J.

[73] Assignee: Kissler & Co., Inc., Englewood, N.J.

[22] Filed: Oct. 1, 1974

[21] Appl. No.: 511,314

[52] U.S. Cl............................ 16/110 R; 403/359; 403/361
[51] Int. Cl.²......................................... A47B 95/02
[58] Field of Search............. 16/110 R, 114 R, 117; 403/17, 33, 243, 263, 361, 359, 3, 354, 383

[56] References Cited
UNITED STATES PATENTS

| | | | |
|---|---|---|---|
| 1,611,549 | 12/1926 | Moore | 16/110 R |
| 1,796,721 | 3/1931 | Price et al. | 16/110 R |
| 1,958,165 | 5/1934 | Le Compte | 16/117 X |
| 2,191,304 | 2/1940 | Ashendorf | 403/383 X |
| 2,723,139 | 11/1955 | Whiteley | 403/361 |
| 2,838,270 | 6/1958 | Danielson | 403/359 X |
| 2,840,382 | 6/1958 | Velepec | 403/354 X |
| 3,173,462 | 3/1965 | Koeppel | 403/359 X |
| R20,445 | 7/1937 | Newmark | 403/3 |

FOREIGN PATENTS OR APPLICATIONS

| | | | |
|---|---|---|---|
| 1,124,571 | 7/1956 | France | 403/263 |
| 403,967 | 10/1924 | Germany | 16/110 R |

*Primary Examiner*—George H. Krizmanich
*Attorney, Agent, or Firm*—Donnelly, Maky, Renner & Otto

[57] ABSTRACT

This invention relates to a lever type faucet handle, particularly a lever type handle having an elongated arm and upstanding flag portion for elbow operation, which is readily adapted for use with valve or faucet stems of various sizes and configurations. The lever handle includes a base with a tapered interior standard size cavity into which interchangeable inserts, each of which has a broach to fit a specific valve stem spline, are placed to provide an interface between the handle and a valve stem. The handle therefore may be used for attachment to any valve stem regardless of the spline thereof provided that an appropriate insert is first placed in the handle cavity.

10 Claims, 4 Drawing Figures

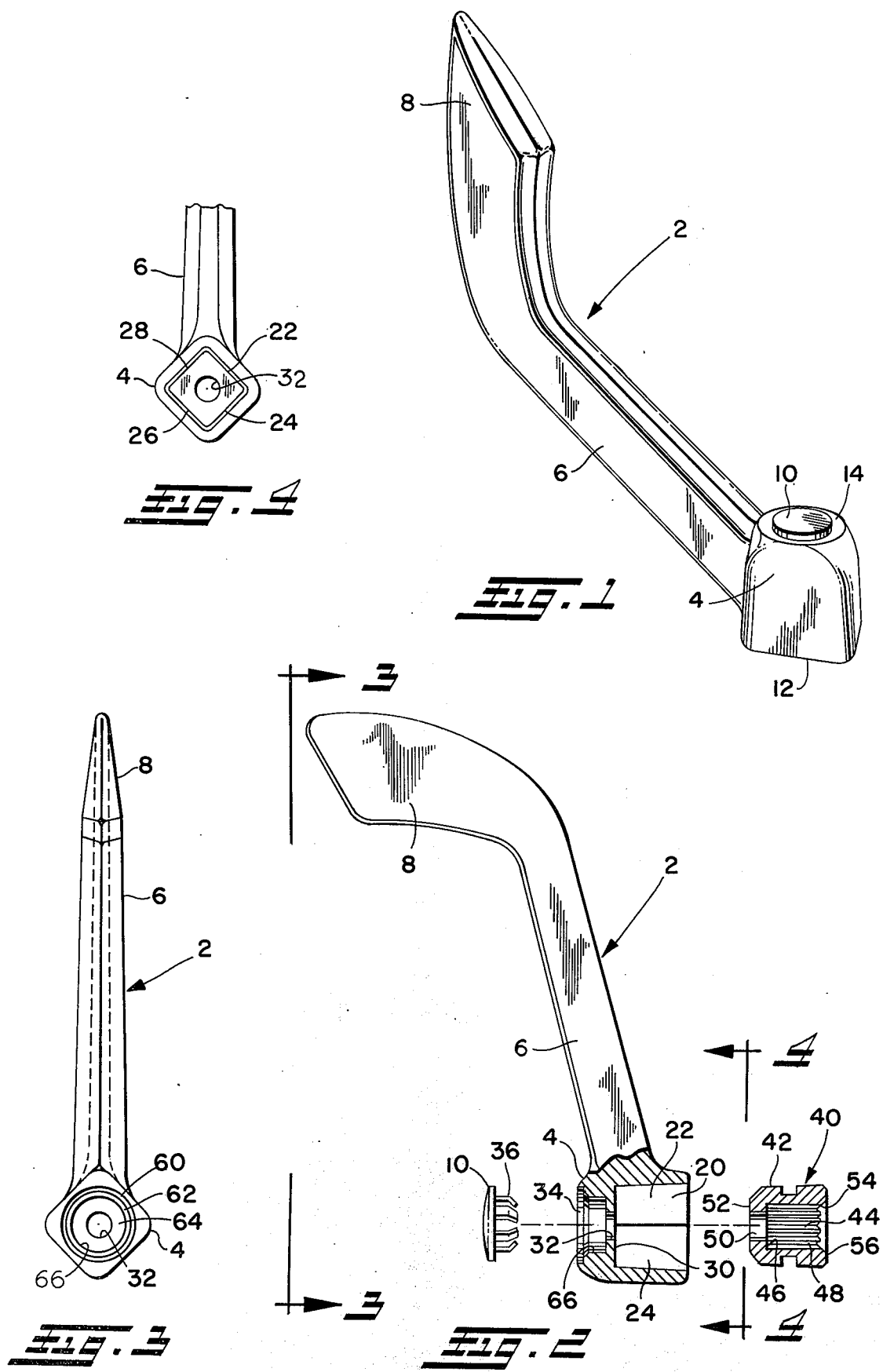

3,965,528

UNIVERSAL ELBOW ACTION LEVER HANDLE

BACKGROUND OF THE INVENTION

This invention relates to a lever action handle for water faucets and the like, and more particularly relates to such a handle which is readily adapted to fit all types of valve stems. Moreover, this invention relates to a lever type handle which includes an upstanding flag portion for facility of manipulation including manipulation by the elbow of the user, referred to hereinafter as elbow action.

Two standard types of faucet handles are commonly used for attachment to valve stems of faucets, including lever type handles and canopy type handles. The canopy handle has a handle arm attached to a skirt or canopy which covers the upstanding portion of the valve stem above the faucet or water fixture main deck or body portion. Several drawbacks attach to the latter type handle, including, for example, the relatively close size tolerances required, first, for appearance sake and, second, for the sake of proper operation. Thus, a canopy which is too short will not be aesthetically pleasing, whereas a canopy that is too long will not allow sufficient turning of the handle for complete valve closure. Another disadvantage to canopy handles is that they provide a relatively large unaccessible interior area within which dirt and germs may accumulate, thus making that type handle undesirable for hospital use. On the other hand lever type handles, which include a lever arm directly connected to the valve stem or indirectly connected thereto via an integral base connecting portion, are not subject to such close tolerance requirements nor do they provide large interior unaccessible areas within which dirt and germs may collect. One problem, however, with conventional lever type handles is that they are molded or cast with an internal broach, which is a cavity having longitudinal grooves or slots, in the base of a size and configuration to mate with a specific corresponding spline, which are the grooves or slots formed at the end of a conventional valve stem, for interconnection between the two for valve operation. Therefore, a manufacturer and/or supplier of handles must maintain a large inventory of conventional handles matching the respective different splines of faucet and valve stem manufacturers in order to meet customer requirements.

Faucet handles of the lever type primarily take two forms, including, first, the conventional cross bar handle which has two perpendicular members making up the portion of the handle usually grasped for operation and, second, single arm handles, which have a single elongated arm extending from the handle base, which is attached to the valve stem. The instant invention is primarily directed to a handle of the lever type which has an elongated arm portion terminating in an upstanding flag portion for convenience of manipulation, although the principles of the invention also may be applied to a lever handle of the cross arm type or one without a flag. Moreover, the invention is directed to a lever action handle having a standard size cavity in the base for receiving interchangeable inserts each of which has an outer profile to fit in the cavity and an interior broach for connection to respective valve stem splines, thus making the relatively expensive handle readily adaptable to fit all valve stems regardless of spline when used with an appropriate relatively low cost insert. Although one prior art handle of the canopy type has a molded interior standard size receptacle that receives interchangeable inserts for attaching the handle to respective valve stems, such canopy handle suffers from the above mentioned disadvantages.

SUMMARY OF THE INVENTION

Briefly described, the lever type handle of the instant invention comprises a base within which is formed a standard size cavity, an elongated handle arm portion extending from the base, and an upstanding handle flag portion. Such handle provides for convenience of manipulation both by physicians and nurses, who after washing their hands often wish to close a water faucet by using their elbows against the upstanding handle flag portion, and by weak and invalid patients, who can easily grasp or manipulate the elongated handle arm or handle flag portion to provide a large torque over the former to the base for opening or closing the faucet. Moreover, the low cost interchangeable inserts provided for the handle make the same readily adaptable to fit all valve stem splines, which permits the handle itself to be mass produced with the attendant advantages of mass production including cost reduction thereof. Such handle cost reduction has become increasingly important in the replacement handle industry because many states are now requiring hospitals, nursing homes and the like to replace conventional faucet handles with elbow action lever type handles for cleanliness reasons, convenience and ease of manipulation reasons, and the like. Therefore, the handle of the instant invention may be used to replace all prior faucet handles simply by selection of and use with a proper low cost insert element.

Accordingly, it is a primary object of the invention to provide a lever type handle improved in the noted respects.

Another object of the invention is to provide a low cost mass produced lever type handle which is capable of fitting all faucet valve stems.

An additional object of the invention is to provide an elbow action lever type handle that is readily adaptable to fit all faucet valve stems.

A further object of the invention is to facilitate manipulation of faucet valve stems using a lever type handle capable of fitting all faucet valve stems.

Still another object of the invention is to facilitate maintenance of cleanliness and sterile conditions by using a lever type faucet handle readily adaptable to fit all faucet valve stems.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

FIG. 1 is an isometric view of an elbow action lever type handle in accordance with the invention;

FIG. 2 is an elevation view, partially broken away, of the elbow action lever type handle of FIG. 1;

FIG. 3 is a top plan view of the elbow action lever type handle of the invention looking in the direction of the arrows 3—3 of FIG. 2; and FIG. 4 is a bottom view of the elbow action lever type handle looking in the direction of arrows 4—4 of FIG. 2.

DESCRIPTION OF THE PREFERRED EMBODIMENT

Referring now more particularly to the drawing, wherein like reference numerals designated like parts of the several figures, an elbow action lever type handle for attachment to the valve stem of a conventional water faucet is illustrated at 2 in FIG. 1. Although the invention will be described in detail with reference to an elbow action lever type handle having a single elongated arm, the principles of the invention may be extended to any lever type handle, such as, for example, a cross arm handle or the like, which have a plurality of elongated arms, as distinct from canopy handles, wherein the arm is attached to the canopy, in order to avoid the above-mentioned and other disadvantages appurtenant to the latter.

The handle 2 includes a relatively enlarged base portion 4 from which a directly connected elongated arm portion 6 extends and terminates in an upstanding flag portion 8. The base, arm and flag portions are preferably integrally molded. A removable cap 10 is located in the base 4 as a decorative part, and the cap may be inscribed, for example, with an appropriate letter to indicate whether the handle controls hot or cold water. The distance from the bottom 12 to the top 14 of the handle base 4 is sufficiently great to provide for handle attachment to faucet valve stems of various lengths while maintaining a pleasing aesthetic appearance of the overall faucet fixture. Moreover, the exterior profile of the handle base 4 is relatively large to provide adequate strength for transmission of the relatively large torque which may be exerted thereon during manipulation of the handle to the faucet valve stem, not shown, to open or to close the same. Also, the arm portion extends at an upward angle from the normal to said base portion and to the direction of extent of the valve stem for clearance purposes, if desired.

Turning now more particularly to FIG. 2, the base 4 of the handle 2 includes a relatively large standard size cavity 20 of generally rectangular outline defined by the tapered side walls 22, 24, 26, 28, seen more clearly in FIG. 4, and by the roof wall 30. A screw hole 32 in the cavity roof wall 30 connects with a stepped recess 34 in the top of the base into which spring fingers 36 of the cap 10 fit for retention of the latter to conceal a screw, not shown, which provides for attachment of the handle 2 to a faucet valve stem, also not shown. As mentioned above, the thickness of the base 4 from the side walls of the cavity 20 to the exterior of the base is sufficiently large to provide adequate handle strength, and the relatively large interior dimensions of the cavity provide for receipt of interchangeable inserts, such as the insert 40 shown. Moreover, the tapered walls defining the cavity 20 provide optimum mechanical coupling with the insert 40.

The insert 40 has an external generally rectangular or box-like configuration of side walls 42, which also may be slightly tapered, for insertion into the standard size cavity 20 of the handle 2 to fit snugly therein for optimum mechanical coupling between the two. Moreover, a broach 44 formed internally of the insert 40 is, for example, generally of open cylindrical configuration terminating at an interior end wall 46, and a plurality of longitudinally extending grooves 48 in the broach are designed to mate with corresponding grooves cut in the spline of a faucet valve stem. A screw hole 50 through the top 52 of the insert 40 through the roof end wall 46 of the broach 44 provides a passageway for the above-mentioned screw for attachment of the handle 2 to the valve stem. Moreover, a tapered entrance 54 is provided in the bottom 56 of the insert 40 to guide the faucet valve stem spline into the broach 44.

As illustrated in FIGS. 2 and 3, the recess 34 includes a wide diameter groove-like portion 60 within which the head of the cap 10 fits and rests, a tapered groove like portion 62 which guides the spring fingers 36 into a narrow cavity portion 64 against the cylindrical side wall 66 of which the spring fingers hold in frictional engagement. Moreover, the handle arm portion 6 may be relatively wide for strength, and such portion as well as the handle flag portion 8 taper as indicated for aesthetic purposes.

Preferably the elbow action lever type handle 2 is molded as a single piece of brass or other similar strong material, and the exterior surfaces thereof may be chrome plated for aesthetic appearance purposes. Moreover, the interchangeable inserts 40 used with the handle 2 are preferably manufactured in noncorrosive solid brass to assure long wear and for strength in providing an effective interface for intermediate connection between the handle base 4 and a faucet valve stem. If desired, a steel tapered self-threading insert may be used for coupling with valve stems having completely stripped splines. The cap 10 is preferably made of plastic with an appropriate letter formed thereon to designate whether the handle 2 is for hot or cold water.

The handle 2 is universal in that it is capable of adaptation to fit valve stems of any size or configuration of spline simply by the selection of an insert 40 of appropriate configuration having a complementary broach 44 to mate firmly with the faucet valve stem spline. Moreover, the length of the insert 40 from the top 52 to the bottom 56 thereof and more particularly the height of the broach 44 may be varied depending on the size of the spline on the valve stem; and it should be noted that such variation in length may be made without concern for the length of the handle base 4 from its bottom 12 to its top 14. Therefore, the handle 2 may be attached to virtually any size or configured valve stem.

To attach a handle 2 to a valve stem an appropriate insert 40 having a broach that mates with the spline of the valve stem is selected and inserted into the standard size cavity 20, and the handle and insert combination is urged onto the faucet stem spline in conventional manner. A screw then may be placed through the screw holes 32 and 50 and screwed into a female threaded opening in the valve stem to attach securely the handle to the valve stem. If the handle controls hot water, a cap 10 with an inscribed letter H is urged into the stepped recess 34 to cover the screw head, or if the handle controls cold water, a cap with an inscribed letter C is used.

Thus, the elbow action lever type handle 2 may be manufactured in large quantities which will effect a reduction in manufacturing cost thereof. Moreover, a manufacturer and/or wholesaler or jobber will be able to maintain a reasonable inventory of such universal handles to meet his customer requirements. Since each valve stem manufacturer usually has its own valve stem spline design, corresponding inventories of inserts 40 also would be required for completion of each handle; however, the relatively small inventory of universal handles and relatively larger inventory of low cost inserts to meet customer requirements would be substantially less expensive and less space consuming than the maintenance of an inventory of individual handles for each type of valve stem spline.

It should now be understood that the universal elbow action lever type handle 2 described above may be attached to any conventional valve stem using an appropriate insert 40. Moreover, the handle facilitates manipulation by invalid or weak persons by providing the large flag portion 8 for grasping and a long moment arm of the handle arm portion 6 for application of force to the valve stem. Furthermore, the upstanding flag portion 8 permits manipulation of the handle by a user's elbow in order to preclude any contamination of the hands after washing.

The embodiments of the invention in which an exclusive property or privilege is claimed are defined as follows:

1. A universal lever type handle device readily convertible for secure attachment to any one of a plurality of valve stems, having differently configured splines, to operate the same, comprising a handle portion and an interchangeable insert member therein; said handle portion including a solid base portion and an elongated arm directly attached to said base portion for manipulation of the handle, said base portion including top, bottom and side walls, a relatively large interior standard size cavity having an access opening in said bottom wall to receive any one of a plurality of interchangeable insert members, a roof defining wall in said cavity proximate said top wall of said base portion, and a screw hole through said top and roof defining walls; each of said interchangeable insert members having an exterior configuration corresponding to the configuration of said cavity so as to fit securely in said cavity, and each of said interchangeable insert members having an interior broach respectively configured for secure mating attachment to a correspondingly configured spline of a respective valve stem, each of said interchangeable insert members having a screw hole through a top wall thereof for positioning in direct alignment with said screw hole in said handle portion; whereby such an insert member fits firmly in said cavity to adapt the lever type handle for attachment to a respective valve stem spline and the handle may be secured by a screw through said screw holes to such a valve stem spline, and by interchanging insert members one for another the lever type handle may be readily adapted for attachment to different corresponding valve stem splines.

2. A universal lever type handle as set forth in claim 1, said cavity having relatively smooth interior walls, said interior walls being gradually tapered from their beginning at said access opening to their termination at a roof defining wall proximate said top wall of said base portion.

3. A universal lever type handle as set forth in claim 2, said tapered interior walls being of generally rectangular configuration.

4. A universal lever type handle as set forth in claim 3, further comprising a screw hole through said roof defining wall.

5. A universal lever type handle as set forth in claim 1, further comprising an upstanding flag portion at the end of said elongated arm remote from said solid base portion.

6. A universal lever type handle as set forth in claim 1, further comprising a stepped recess in the top of said base portion and a removable snap cap inserted in the same.

7. A universal lever type handle as set forth in claim 1, said handle and such insert comprising brass.

8. A universal lever type handle as set forth in claim 1, wherein said base portion and elongated arm comprise brass exteriorly plated with chrome.

9. A universal lever type handle as set forth in claim 1, wherein said base portion and said elongated arm are integrally molded from a common material as a single part.

10. A univeral lever type handle as set forth in claim 1, wherein said cavity has a generally longitudinal axis, said access opening is generally in a plane perpendicular to said axis, and said elongated arm portion extends from said base portion at an upward angle from the normal to said base portion, to said axis and, thus, to the direction of extent of a valve stem to which the latter may be attached.

* * * * *